United States Patent
Fyke

(10) Patent No.: US 8,190,220 B2
(45) Date of Patent: May 29, 2012

(54) SLIDER MECHANISM AND CONFIGURATION FOR A MOBILE COMMUNICATION DEVICE

(75) Inventor: Steven H. Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 595 days.

(21) Appl. No.: 12/363,028

(22) Filed: Jan. 30, 2009

(65) Prior Publication Data

US 2010/0197370 A1    Aug. 5, 2010

(51) Int. Cl.
*H04M 1/00* (2006.01)
(52) U.S. Cl. .................... 455/575.4; 379/330
(58) Field of Classification Search ........... 455/575.4, 455/575.3, 575.1; 348/376; 379/330
See application file for complete search history.

(56) References Cited

U.S. PATENT DOCUMENTS

| | | | |
|---|---|---|---|
| 6,073,027 | A | 6/2000 | Norman et al. |
| 6,842,626 | B1 | 1/2005 | Kubo et al. |
| 7,003,104 | B2 | 2/2006 | Lee |
| 7,136,688 | B2 | 11/2006 | Jung et al. |
| 7,146,184 | B1 | 12/2006 | Tsitsiashvili |
| 7,319,892 | B2 | 1/2008 | Kato |
| 7,400,913 | B2 | 7/2008 | Richter et al. |
| 7,443,657 | B2 | 10/2008 | Gitzinger et al. |
| 2005/0190291 | A1 | 9/2005 | Kota |
| 2006/0135199 | A1 | 6/2006 | Richter et al. |
| 2006/0252471 | A1 | 11/2006 | Pan |
| 2007/0254691 | A1 | 11/2007 | Lu |

OTHER PUBLICATIONS

Olson, Darrin; MOTORIZR Z8 Has New Angle on Slide Out Design; Feb. 13, 2007; 2 pages; online: http://www.slipperybrick.com/2007/02/motorizr-z8-has-new-angle-on-slide-out-design/ (printed Oct. 9, 2008).
Vogel, Sandra; Motorola MOTO Z10 Review; TrustedReviews; Jun. 12, 2008; 2 pages; online: http://www.trustedreviews.com/mobile-phones/review/2008/06/12/Motorola-MOTO-Z10 . . . (printed Nov. 14, 2008).
Motorola—Motorizr Z8 Review; IT Reviews; Sep. 14, 2007; 2 pages; online: http://www.itreviews.co.uk/hardware/h1342.htm (printed Nov. 14, 2008).
Motorola RIZR Z8; Wikipedia Sep. 25, 2008; 4 pages; online: http://en.wikipedia.org/wiki/Motorola_RIZR_Z8 (printed Nov. 14, 2008).
Motorola Moto-RIZR Z8 Review; IT Work Shop; Jan. 11, 2008; 6 pages; online: http://itworkshop.wordpress.com/2008/01/11/motorola-moto-rizr-z8-review/ (printed Nov. 14, 2008).
Motorola MotoRIZR Z8 Cell Phone Review; Cell Phone Hits!—Daily Phone Buzz; Mar. 5, 2007; 7 pages; online: http://www.cellphonehits.net/motorola-motorizr-z8-cell-phone-review/ (printed Nov. 14, 2008).
Brian B; motoRIZR Z8 is "Fit-to-Face"; Cell phones etc.; Feb. 12, 2007; 4 pages; online: http://www.cellphones.ca/news/post002123/ (printed Nov. 14, 2008).
Motorola Inc.; High Speed, Outstanding Video Resolution and Stunning Design Unite in MOTORIZR Z8; Feb. 12, 2007; 1 page; online: http://www.motorola.com/mediacenter/news/detailpf.jsp?globalObjectId=7723_7652_23 (printed Oct. 9, 2008).

*Primary Examiner* — Tu X Nguyen
(74) *Attorney, Agent, or Firm* — Bennett Jones LLP

(57) ABSTRACT

A mobile device comprising a base and a cover operatively coupled with a hinge-less slider mechanism and configured to move on an angle between a closed position and an open position. The base includes a keypad which is accessible when the cover is in the open position and the cover includes a display module for facilitating telephony and data functions such as email, text messaging, web browsing and voice calling. According to an embodiment, the mobile device is configured to provide a thinner profile in the open position which provides the ergonomic feel of a thinner mobile device.

11 Claims, 4 Drawing Sheets

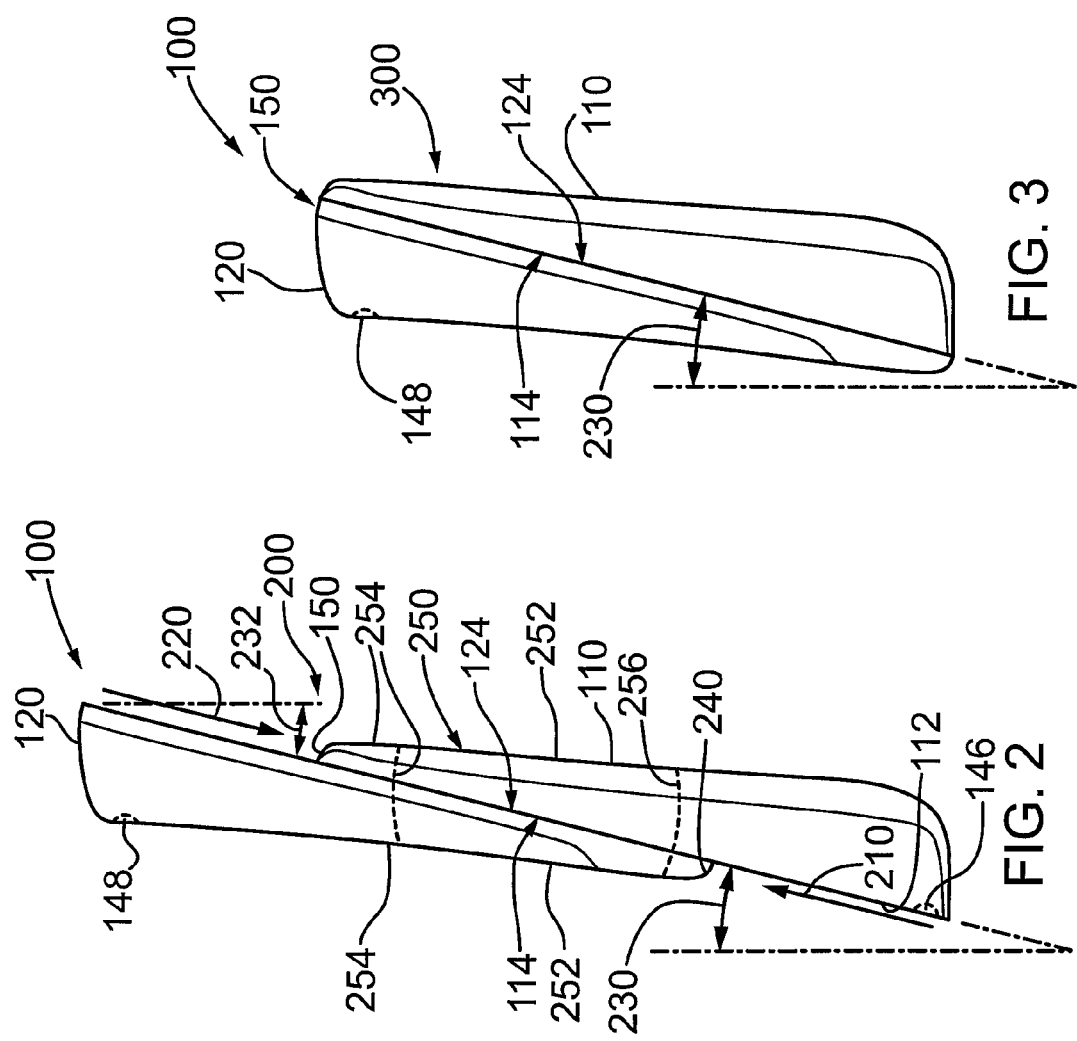

SLIDER MECHANISM AND CONFIGURATION FOR A MOBILE COMMUNICATION DEVICE

FIELD OF THE APPLICATION

The present application relates to mobile devices, and more particularly to a slider mechanism and configuration for a mobile communication device.

BACKGROUND OF THE APPLICATION

The functionality associated with mobile communication devices continues to increase and the convergence of voice and data functions is becoming the norm. Mobile communication devices are typically equipped to provide email, text messaging and web browsing functions. In addition, mobile communication devices are also available that include MP3 capabilities, a digital camera and/or integrated GPS functionality. With the increased functionality and features being put into mobile communication devices, there comes the need for expanded user controls for data entry and navigation. As a result, mobile communication devices are typically configured with a keypad for entering telephone numbers and/or text and alphanumeric characters, function keys/buttons and navigation tools, such as, menu keys, a trackball, scroll wheel and the like.

In order to be useful, the functionality and controls associated with the mobile communication device must be easily accessible by a user and the ergonomics of the mobile communication device become an important consideration for a user in order to handle the increasing functionality and feature set.

Accordingly, there remains a need in the art.

BRIEF DESCRIPTION OF THE DRAWINGS

Reference will now be made to the accompanying drawings which show, by way of example, embodiments according to the present application, and in which:

FIG. 2 is a side view of the mobile communication device of FIG. 1 in an open position;

FIG. 3 is a side view of the mobile communication device of FIG. 1 in a closed position;

Like reference numerals indicate like or corresponding elements in the drawings.

DETAILED DESCRIPTION OF THE EMBODIMENTS

The present disclosure generally comprises a mobile communication device or handheld device with a slider mechanism and configuration.

According to one embodiment, the present application provides a mobile device comprising a base component having a base slider face; a cover component having a cover slider face opposing the base slider face; a slider mechanism configured for operatively coupling the cover to the base, and the slider mechanism being configured for moving the cover slider face relative to the base slider face between an open position and a closed position; and wherein the base or the cover or both has a tapered profile such that the slider face is configured at an angle with respect to the outer major surface of the respective cover or base.

According to another embodiment, the present application provides a mobile communication device comprising: a base having a base slider face configured at an angle; a cover having a cover slider face configured at an angle with respect to the base; a hinge-less slider mechanism configured for operatively coupling the cover to the base, and the slider mechanism is configured for moving the cover slider face relative to the base slider face between an open position and a closed position.

Figure 1:
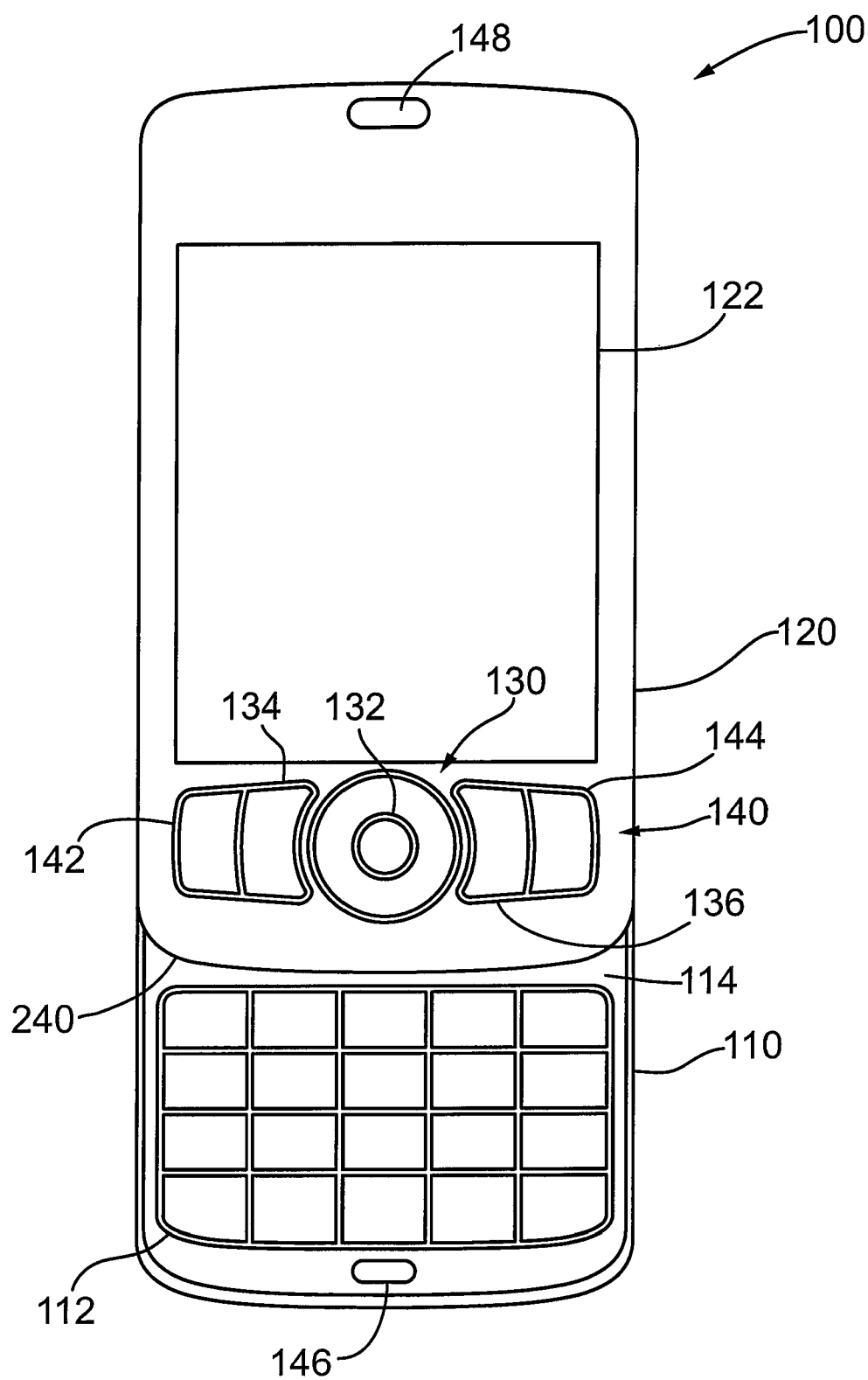
FIG. 1 is a top view of a mobile communication device with a slider mechanism according to an embodiment.

Reference is first made to FIG. 1, which shows in diagrammatic form a mobile device according to an embodiment and indicated generally by reference 100. According to an embodiment, the mobile device 100 comprises a mobile communication device such as a BlackBerry™ handheld device or a cellular phone or communication device.

As shown in FIG. 1, the mobile device 100 comprises a base or lower component 110 and a cover or upper component 120. According to an embodiment, the cover 120 is similarly shaped to the base 110.

According to an embodiment, the base 110 includes a keypad or keyboard 112, and the cover 120 includes a display 122. According to an embodiment, the keypad 112 comprises a dual-function keyboard with a telephone dial pad (i.e. for numeric entry) and a QWERTY style keyboard for entering alphanumeric characters, e.g. for text messaging or email applications. According to an embodiment, the cover 120 includes navigation tools or controls indicated generally by reference 130. According to an embodiment, the cover 120 includes telephony keys or controls indicated generally by reference 140. According to another embodiment, the telephony keys 140 and/or navigation controls 130 may be situated or configured with the base 110. According to an embodiment, the navigation controls 130 include a trackball 132 (or other type of pointing device or mechanism), a menu key 134 and an escape or return key 136. The telephony keys or controls include a send or call key 142 and an end call key 144. It will be appreciated that other key, button or control configurations are possible according to other embodiments. According to an embodiment, the base 110 includes a microphone or similar transducer component indicated by reference 146 in FIG. 1, and the cover 120 includes a receiver (e.g. speaker) or similar transducer component indicated by reference 148.

According to an embodiment, the mobile communication device 100 is implemented with voice and data communication functionality. The mobile communication device 100 comprises a central processing unit or CPU (not shown). The CPU operates under the control of a program (i.e. firmware or software) stored in program memory. The CPU is also provided with data memory. The CPU is also operatively coupled to the keyboard 112, the display module 122 and the track wheel 132, and an audio transducer or speaker. In addition to the program executable code provided for performing the functions associated with the operation of the mobile communication device 100, the program memory includes other programs or applications, for example, a browser program. The browser program allows a user to access web pages on the Internet using the mobile communication device 100, i.e. utilizing a graphical user interface comprising, for example, the keyboard 112 and the display module 122 and/or the track wheel 132. The mobile communication device 100 includes a RF, demodulation/modulation and decoding/coding circuits, and a suitable RF antenna. The RF demodulator/modulator and decoder/coder circuits and the RF antenna are operatively coupled to the CPU and provide an interface for wireless communication with the wireless network. The particular implementation details of the voice and data functions and RF circuits will be within the understanding of those skilled in the art, and is therefore not described in further detail.

The cover 120 or upper component is operatively coupled to the base 110 via a slide mechanism, indicated generally by reference 150. The slide mechanism 150 is configured to allow the cover 120 to slide with respect to the base 110 between an open position as indicated by arrow 210 in FIG. 2 and a closed position as indicated by arrow 220 in FIG. 2. In the open position, as indicated by reference 200 in FIG. 2, the mobile device 100 is turned on, e.g. the display screen 122 is activated and the telephone and/or data functions are operational. According to an embodiment, the keys in the keypad 112 and/or the navigation controls 130 and/or the call keys 140, are backlit or otherwise illuminated in the operating state. In the closed position, as indicated by reference 300 in FIG. 3, the device 100 is turned off or operating in sleep mode, as known in the art.

Figure 4:
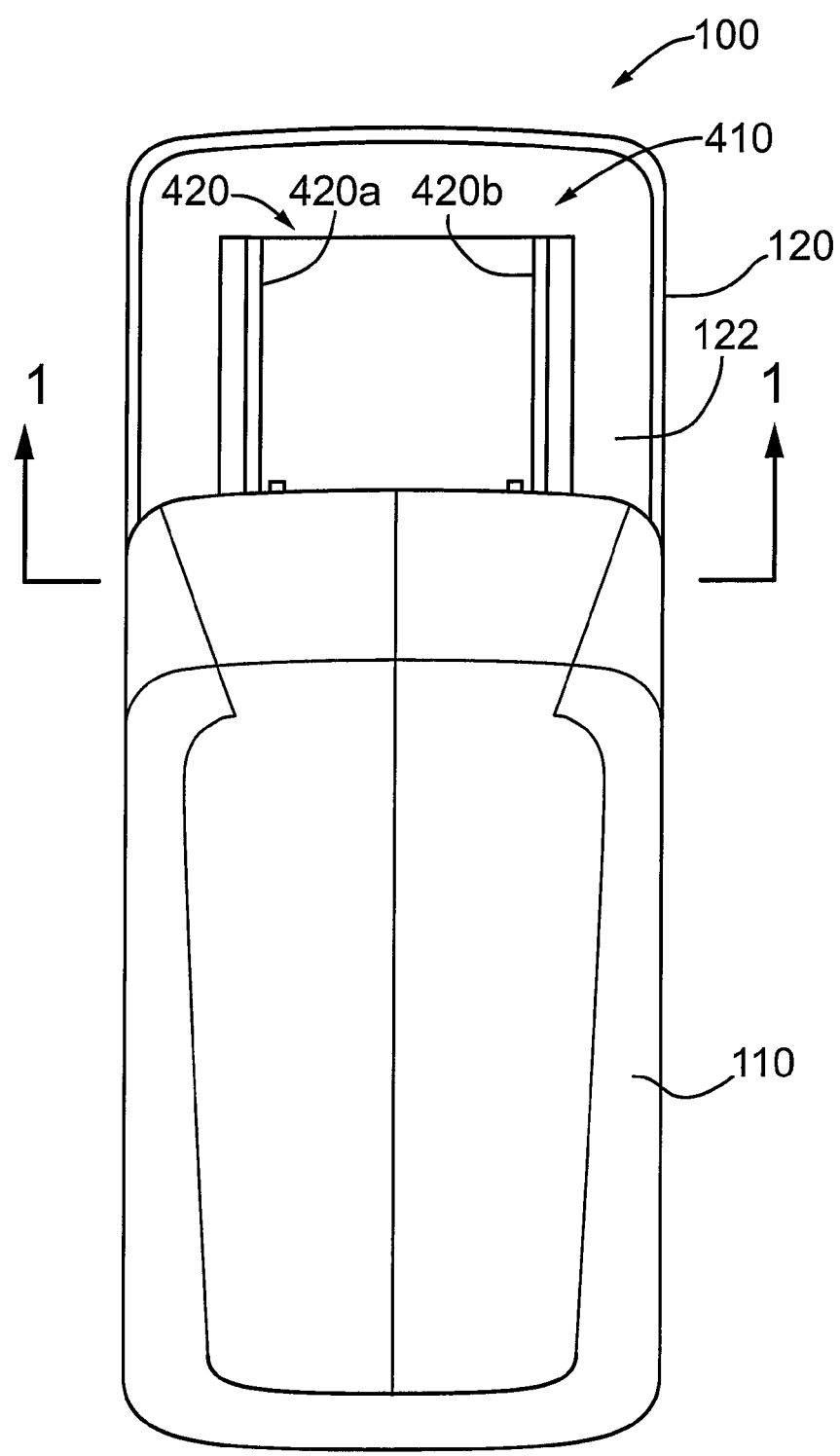
FIG. 4 is a bottom view of the mobile communication device of FIG. 1.
Figure 5:
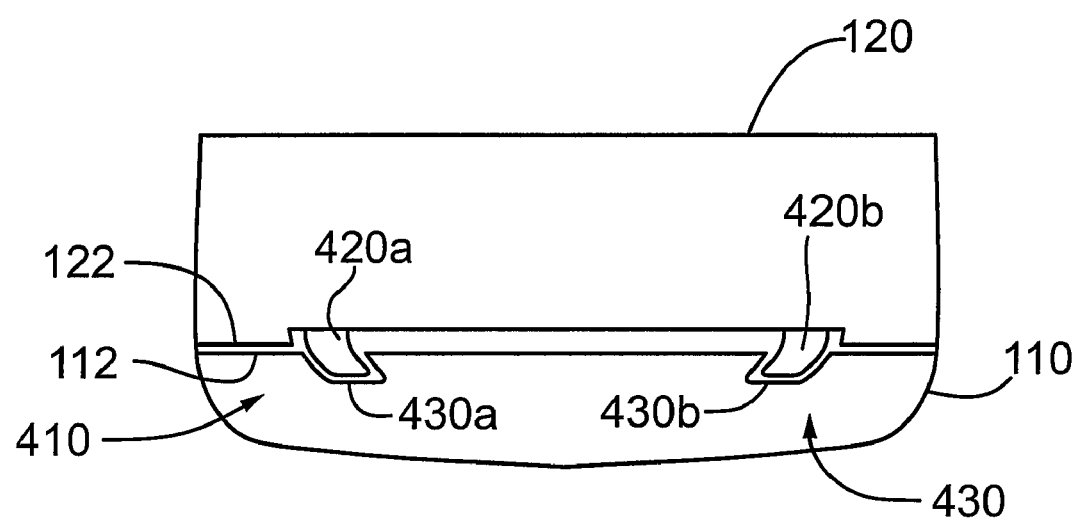
FIG. 5 is a sectional view of the mobile communication device of FIG. 4 taken along line 1-1 in FIG. 4.

The slide mechanism 150 comprises a hinge-less slider mechanism and may be implemented in a manner as described in more detail below. According to an embodiment, the slide mechanism 150 comprises a pair of rails 420 configured or formed on the cover 120 and a corresponding pair of channels or slots configured or formed on the base 110 (i.e. the top side of the base 110) as depicted in FIG. 4. The rails 420, indicated individually by references 420a and 420b, are configured to fit and slide in the respective channels or slots 430, indicated individually by references 430a and 430b in FIG. 5. The slide mechanism 150 is configured to allow the cover 120 (FIG. 2) and/or the base 110 to move linearly with respect to each other in the open position 200 (FIG. 2) to the closed position 300 (FIG. 3) and vice versa. It will be appreciated that other slide or guiding mechanisms may be utilized and the particular implementation details will be within the knowledge of those skilled in the art.

Referring back to FIG. 2, the base 110 includes a base slider face or surface indicated generally by reference 114. Similarly, the cover 120 includes a cover slider face or surface indicated generally by reference 124. According to an embodiment, the base 110 and/or the cover 120 have a tapered profile such that the base slider face 114 is configured at an angle 230 with respect to an outer major surface of the respective cover 120 or the base 110. According to an embodiment, the cover slider face 124 is configured at an angle 232 with respect to an outer major surface of the respective base 110 or the cover 120. According to an embodiment, the angles 230, 232 are substantially identical. According to an embodiment, the angle 230 of the base slider face 114 is approximately 10 degrees and the angle 232 of the cover slider face 124 is approximately 10 degrees. According to this aspect, the cover 120 and the base 110 slide relative to each other in a single action motion to provide access to the keypad 112 (i.e. in the open position 200), and/or controls or function buttons on the base 110, without the need for a hinge or other additional mechanical components. According to another aspect, the angular displacement between the base 110 and the cover 120 in the open position 200, for example, as depicted in FIG. 2, provides an angular offset or configuration between the receiver 148 and the microphone 146, which serves to improve the ergonomic handling or comfort of the mobile device 100 for example, for a voice call.

Reference is again made to FIG. 2. According to another aspect, the configuration of the base slider face 114 and the cover slider face 124 provides the mobile device 100 with a hand grip 250, i.e. a gripping section, textured section, contoured section or a hand holding section, that is thinner in the open position 200 than in the closed position 300 (FIG. 3). The gripping section 250 can be formed into the base 110 and/or the cover 120 and extend along the length of the device 100, for example, as indicated by broken outline 254 and 256. The thinner profile of the device 100 in the open position 200 serves to provide the ergonomic feel of a thinner device, for example, a flip phone, while retaining the advantages associated with a slider-type device. According to another aspect, the configuration of the device 100 provides an ergonomic angle or position between the microphone and the receiver components. According to another aspect, the thickness of the gripping section 250 remains substantially constant in the open position 200 as indicated by references 252 and 254. The substantially constant thickness of gripping portion 250 of the device 100 also provides an ergonomic design which facilitates the handling of the device 100 in the hands of a user, for example, when using the data functions or email/text messaging functions, and/or when the device 100 is pressed against a user's ear for a phone call or voice mail.

According to another aspect, the configuration of the base slider face 114 and the cover slider face 124 reduces the step or discontinuity between the cover 120 and the keypad 112 on the base 110. This also improves the ergonomics of the device 100, for example, when the user is using the keypad 112 to compose an email while viewing the display 122. According to an embodiment, the cover 120 includes a front edge 240 with an ergonomic shape or profile, for example, a curved profile or a rounded or radiused edge. The shape of the front edge 240 also provides a form factor that facilitates ease of use when entering either text or numbers.

According to an embodiment, the mobile device 100 comprises a slider communication device with a hinge-less slider mechanism with a configuration that retains the compact design of a slider phone while providing an ergonomic design that is well suited and provides a form factor that facilitates the use of both voice (i.e. telephony) functions, and data (e.g. email, text messaging, web browser) applications.

While the slider mechanism and configuration has been described in the context of a mobile communication device, it will be appreciated that the configuration is suitable for other types of handheld or portable communication and data devices.

The present disclosure may be embodied in other specific forms without departing from the spirit or essential characteristics thereof. Certain adaptations and modifications of the disclosure will be obvious to those skilled in the art. Therefore, the presently discussed embodiments are considered to be illustrative and not restrictive, the scope of the disclosure being indicated by the appended claims rather than the foregoing description, and all changes which come within the meaning and range of equivalency of the claims are therefore intended to be embraced therein.

What is claimed is:

1. A mobile device comprising:
    a base having a base slider face;
    a cover having a cover slider face opposing said base slider face;
    a slider mechanism configured for operatively coupling said cover to said base, and said slider mechanism being configured for moving said cover slider face relative to said base slider face between an open position and a closed position;
    wherein said base or said cover or both has a tapered profile such that said base slider face is configured at an angle with respect to an outer major surface of said respective cover or base;

wherein said slider mechanism comprises one or more rails formed on said cover and one or more respective channels formed on said base configured for moveably engaging said one or more rails; and wherein said base slider face is configured at an angle with respect to said base and said cover slider face is configured at an angle with respect to said base and said angle is approximately 10 degrees.

2. The mobile device as claimed in claim 1, wherein said base includes a keypad that is accessible when said cover is moved into said open position.

3. The mobile device as claimed in claim 2, wherein said cover includes an ergonomically shaped front edge adjacent said keypad.

4. The mobile device as claimed in claim 2, wherein one or more keys are configured on said cover.

5. The mobile device as claimed in claim 1, wherein said cover includes a receiver and said base includes a microphone, and in said open position said receiver is displaced from said microphone in an angular orientation.

6. A mobile device comprising:
a base having a base slider face;
a cover having a cover slider face opposing said base slider face;
a slider mechanism configured for operatively coupling said cover to said base, and said slider mechanism comprising a hinge-less mechanism and being configured for moving said cover slider face relative to said base slider face between an open position and a closed position;

wherein said base or said cover or both has a tapered profile such that said base slider face is configured at an angle of approximately 10 degrees with respect to an outer major surface of said respective cover or base; and wherein said base includes a gripping section and wherein said gripping section provides a thinner device profile when said base and said cover are in said open position.

7. The mobile device as claimed in claim 6, wherein said gripping section comprises a substantially constant thickness when said base and said cover are in said open position.

8. The mobile device as claimed in claim 6, wherein said base includes a keypad that is accessible when said cover is moved into said open position.

9. The mobile device as claimed in claim 8, wherein said cover includes an ergonomically shaped front edge adjacent said keypad.

10. The mobile device as claimed in claim 8, wherein one or more keys are configured on said cover.

11. The mobile device as claimed in claim 6, wherein said cover includes a receiver and said base includes a microphone, and in said open position said receiver is displaced from said microphone in an angular orientation.

* * * * *